US 6,667,771 B1

(12) United States Patent
Kweon

(10) Patent No.: US 6,667,771 B1
(45) Date of Patent: Dec. 23, 2003

(54) WIRELESS IMAGE TRANSMISSION SYSTEM HAVING A PORTABLE CAMERA

(75) Inventor: Sup Heuk Kweon, Chungchonbuk-do (KR)

(73) Assignee: KT & Co., Ltd., Seoul (KR)

( * ) Notice: Subject to any disclaimer, the term of this patent is extended or adjusted under 35 U.S.C. 154(b) by 0 days.

(21) Appl. No.: 09/328,137

(22) Filed: Jun. 8, 1999

(30) Foreign Application Priority Data

Dec. 4, 1998 (KR) ......................................... 1998-53161

(51) Int. Cl.[7] .............................................. H04N 5/225
(52) U.S. Cl. ......................... 348/373; 348/375; 348/376
(58) Field of Search ................................. 348/373, 375, 348/376, 151, 143, 65, 45, 158, 207.99, 211.1, 211.2, 211.14; 235/472.03, 462.45, 462.46; 455/556, 166, 557; 382/188, 313, 314; 345/501, 179; 358/473, 906, 909.1

(56) References Cited

U.S. PATENT DOCUMENTS

| | | | | |
|---|---|---|---|---|
| 4,751,741 A | * | 6/1988 | Mochinaga et al. | 382/314 |
| 4,947,261 A | * | 8/1990 | Ishikawa et al. | 358/473 |
| 5,294,792 A | * | 3/1994 | Lewis et al. | 345/163 |
| 5,527,261 A | * | 6/1996 | Monroe et al. | 348/65 |
| 5,581,783 A | * | 12/1996 | Ohashi | 348/376 |
| 5,594,498 A | * | 1/1997 | Fraley | 348/151 |
| 5,729,251 A | * | 3/1998 | Nakashima | 395/200.2 |
| 5,774,602 A | * | 6/1998 | Taguchi et al. | 382/314 |
| 5,850,058 A | * | 12/1998 | Tano et al. | 382/313 |
| 6,311,042 B1 | * | 10/2001 | DeSchrijver | 455/66 |
| 2002/0126105 A1 | * | 9/2002 | O'Donnel, Jr. | 345/179 |

OTHER PUBLICATIONS

Optical Sensor Systems, "Infrared Sensor System Testing: Performance Characterization vs Ionizing Dose . . . " (1996).
Bishop, G. "Self–Tracker: A Smart Optical Sensor on Silicon". UNC Computer Science Dissertation TR84–002 (1999).

* cited by examiner

Primary Examiner—Aung S. Moe
(74) Attorney, Agent, or Firm—Ladas & Parry

(57) ABSTRACT

A portable small-sized camera has a case having a ball-point pen appearance in a portion thereof and a through hole in one side, and a camera circuit part built in the case and for photographing an object through the through hole. The portable small-sized camera has the ball-point pen appearance, photographing a particular location in secret is possible without exposure to others. The camera circuit part is connected to a wireless transmission device for outputting a signal by a cable. A wireless receiving device at a remote location from the wireless transmission device receives a signal of the wireless transmission device for outputting or recording.

13 Claims, 5 Drawing Sheets

WIRELESS IMAGE TRANSMISSION SYSTEM HAVING A PORTABLE CAMERA

BACKGROUND OF THE INVENTION

1. Field of the Invention

The present invention relates to a wireless image transmission system having a portable small-sized camera (hereinafter, referred to as 'portable camera') for taking pictures in secret at a predetermined place, and more particularly to a wireless image transmission system having a portable camera for monitoring situations at a remote location by mounting a sensor or the like in a case which can not be recognized by others.

2. Description of the Prior Art

There is a situation in which a camera is; necessarily used without its exposure to others for various purposes. For example, a portable camera is sued by a policeman to photograph an illegal trade spot or for monitoring facilities or the like disposed at a specific location. In general, a small-sized camera is installed in a bag or the like, a signal is transmitted through a wire or in a wireless manner, and then a desired object is monitored or recorded at a remote location through the portable camera. Such portable cameras are getting smaller due to technology development. However, since a wireless transmission device or a recording device is needed for transmitting a signal to a remote location or for recording an image, there is a limitation in reducing the size of a portable camera. Further, even though cameras are becoming much smaller, it is difficult to made a camera small-sized to an extend that others can not recognize it.

SUMMARY OF THE INVENTION

Accordingly, it is an object of the present invention to provide a wireless image transmission system having a portable camera in a shape which can not be readily recognized by others.

In order to attain the above object, the portable camera includes a case having a ball-point pen appearance in a portion thereof and a through hole in one side; and a camera circuit part mounted in the case and for photographing an object through the through hole.

As a ball-point pen is carried in a pocket of a shirt in general, people do not pay particular attention to the ball-point pen held in the pocket. In the mean time, since the ball-point pen has adequate room therein for mounting a printed circuit board including an image sensor for taking pictures, a shape of a ball-point pen may be a most proper appearance of a portable small-sized camera.

In general, a ball-point pen has a button and a clip on an upper portion thereof and a protruded nib on a lower portion. In order to reduce weight of a portable camera of a ball-point pen shape, it is preferable to use only an upper portion of the ball-point pen. That is, as only an upper portion of a ball-point pen is held on a pocket of a shirt by a clip for use, the weight due to a refill or any parts on a lower portion can be reduced.

In case that a user carries a portable camera with him, it is preferable to form a through hole of the portable camera at a position enabling a user to take pictures frontwards. It is preferable to form the through hole on the clip concretely, on the connection portion of the clip and the body of a ball-point pen more concretely. In case that a microphone is provided to the portable camera under the necessity of catching an audio signal, it is preferable to mount the microphone on an upper portion, that is, on a portion for a button of a ball-point pen. In order to enhance voice transmission to the microphone, it is preferable to form a through hole on a portion on which the microphone is mounted.

A lens may be mounted in the through hole or on an image sensor in order for light to be projected to the image sensor from outside. Preferably, the lens is mounted for an image to be exactly projected on the image sensor. If necessary, a lens driver may be provided for an exact lens focus.

Preferably, the camera circuit part includes an image sensor and a control circuit for processing a signal of the image sensor. Any device, as an image sensor, for taking pictures may be used, but it is preferable to use a small sensor manufactured in a semiconductor process. The image sensor for black and white colors is preferable for simplifying its component specification. It is preferable for the control circuit to process both an audio signal of the microphone and a signal of the image sensor.

Further, in order to attain the above object, the wireless image transmission system for transmitting an image to a remote location includes a portable camera having a ball-point pen appearance in a portion thereof and a camera circuit part mounted therein for taking pictures; a transmission device for transmitting a signal from the portable camera to a remote location; and a receiving device for receiving a signal transmitted from the transmission device.

Even though a ball-point pen has enough space therein for mounting circuit components, the space is not so spacious enough to accommodate a recording device for recording images taken by the camera or the transmission device. Accordingly, such devices, which has a relatively complex structure with a large volume, are preferably provided as independent devices from the portable camera.

For example, the portable camera is connected to the wireless transmission device by electric wires, and then an image signal and an audio signal are transmitted to a wireless receiving device at a remote location through the wireless transmission device. It is preferable that the portable camera and the wireless transmission device are carried somewhere in the body of a user and the wireless receiving device is separately mounted at a remote location. The valid transmission distance of a signal from the wireless transmission device is different according to a frequency in use, a conversion method, and an environment in use. Accordingly, in certain circumstances, the wireless receiving device, which is small-sized, is connected to the recording device and then may be put in a portable bag, or the wireless transmission device is constructed to amplify and transmit a signal from the wireless transmission device to a more remote location. Any method known in this field may be employed as a wireless transmission method of the wireless transmission device, but it is preferable to perform the transmission through the RF modulation. If a RF modulation method is employed, it is more preferable to use a frequency band free from any interference with other RF signal. It is preferable that the wireless transmission device has a size and weight to an extent that a user can bear it on the belt around his waist.

Power supply for operating the wireless transmission device and the portable camera is preferably provided to the wireless transmission device, but if necessary, the power supply may be provided separately from the wireless transmission device or the portable camera. In case that power supply is mounted to the wireless transmission device, it is preferable that the power supply is provided to the portable camera through a cable which connects the portable camera with the wireless transmission device.

DETAILED DESCRIPTION OF THE PREFERRED EMBODIMENT

Hereinafter, an embodiment of the present invention will be described in detail with reference to the accompanying drawings. However, this embodiment should be interpreted as an example and should not be interpreted in the defined sense of the present invention.

Figure 1:
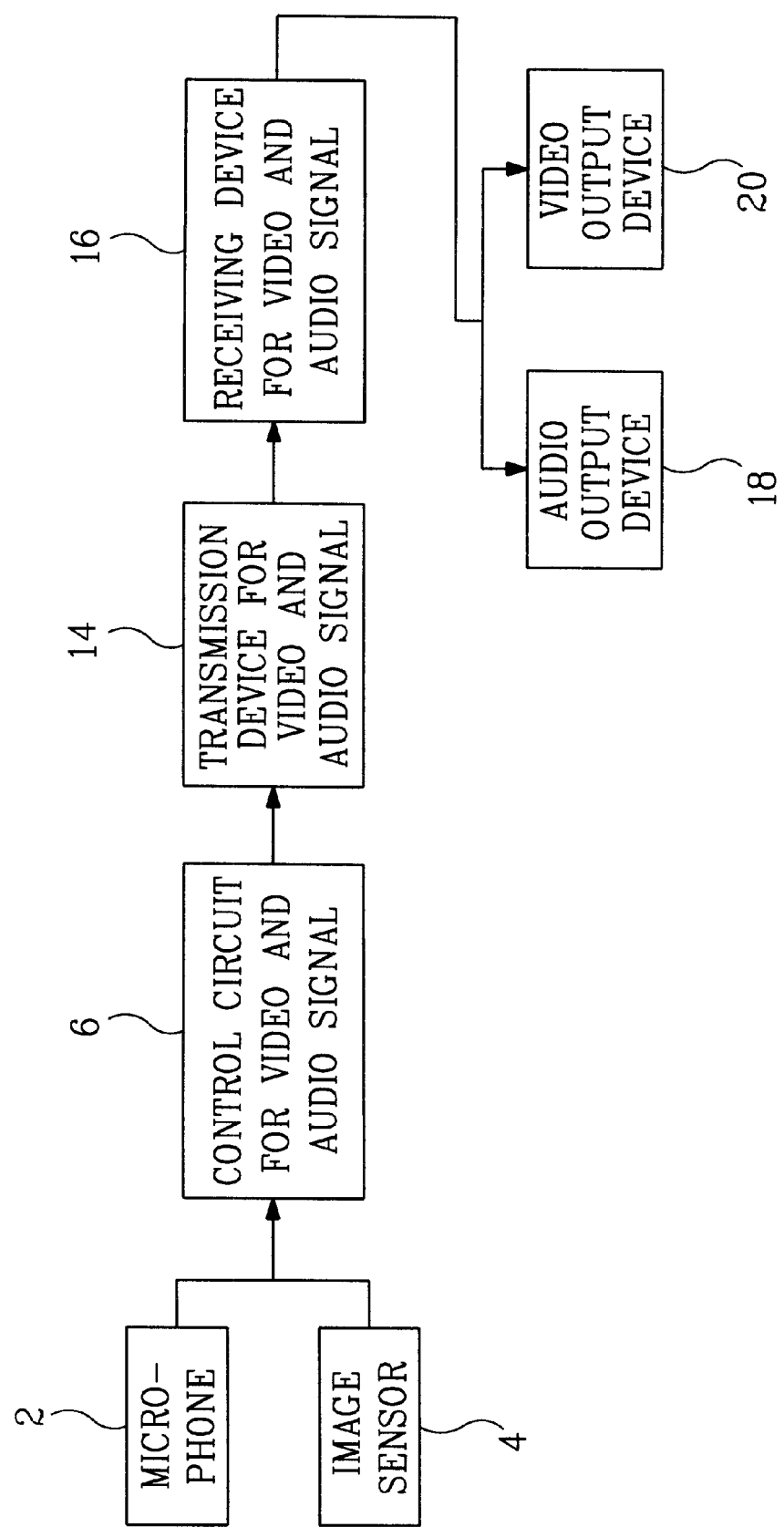
FIG. 1 is a schematic block diagram for showing a wireless transmission device according to an embodiment of the present invention.

FIG. 1 is a block diagram for showing a signal process in an embodiment of the present invention. A microphone 2 built in a portable camera outputs an audio signal and an image sensor 4 outputs a video signal, respectively, to a control circuit for video and audio signal 6. The control circuit 6 converts inputted signal to a signal capable of being transmitted to a transmission device for video and audio signal 14 through a cable. The transmission device 14 modulates a signal transmitted to the cable to output a signal of a radio frequency(RF). The modulated RF signal is received by a receiving device for video and audio signal 16, separated into an audio signal and a video signal, and outputted to an audio output device 18 and a video output device 20. Since the structure of the block diagram for processing a signal is widely known in this field, a detailed description will be omitted.

Figure 2:
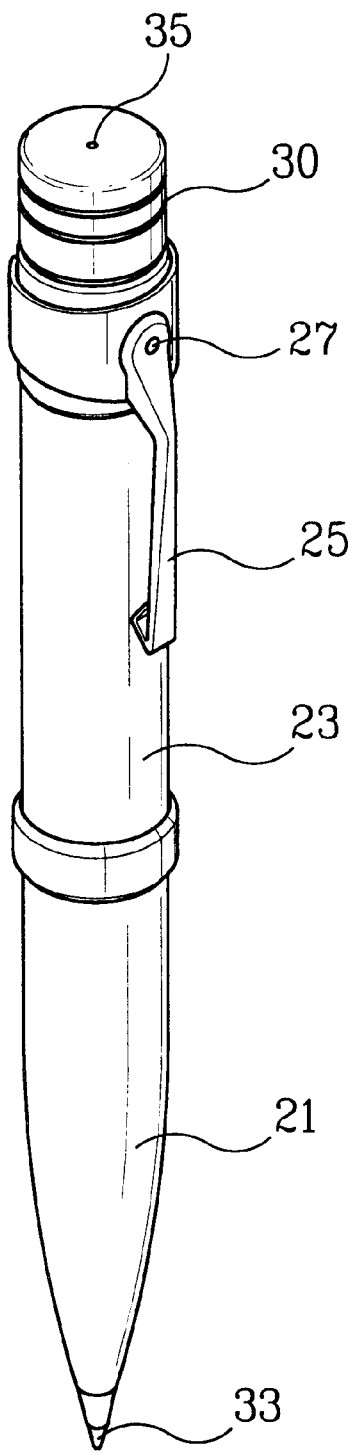
FIG. 2 is a perspective view for showing a portable camera which connects an upper portion to a lower portion according to an embodiment of the present invention.

FIG. 2 is a perspective view for showing a portable camera according to an embodiment of the present invention. The portable camera has an upper portion 23 and a lower portion 21. A clip 25 is mounted on the upper portion 23. A connection portion of the clip 25 and a body has a through hole 27 to transmit light to an image sensor which will be described later. The clip 25 is properly structured to fix the portable camera to a pocket of a shirt. A lens is mounted in the through hole 27. A button portion 30 is provided on the upper end of the upper portion 23, and a hole 35 is formed on an upper side of the button portion 30, so that sound from the external is well transmitted to the microphone. A nib 33 is protruded from the lower end of the lower portion 21. The lower portion 21 and the upper portion 23 are engaged by screw portions formed in the lower and upper portions 21 and 32 respectively.

Figure 3:
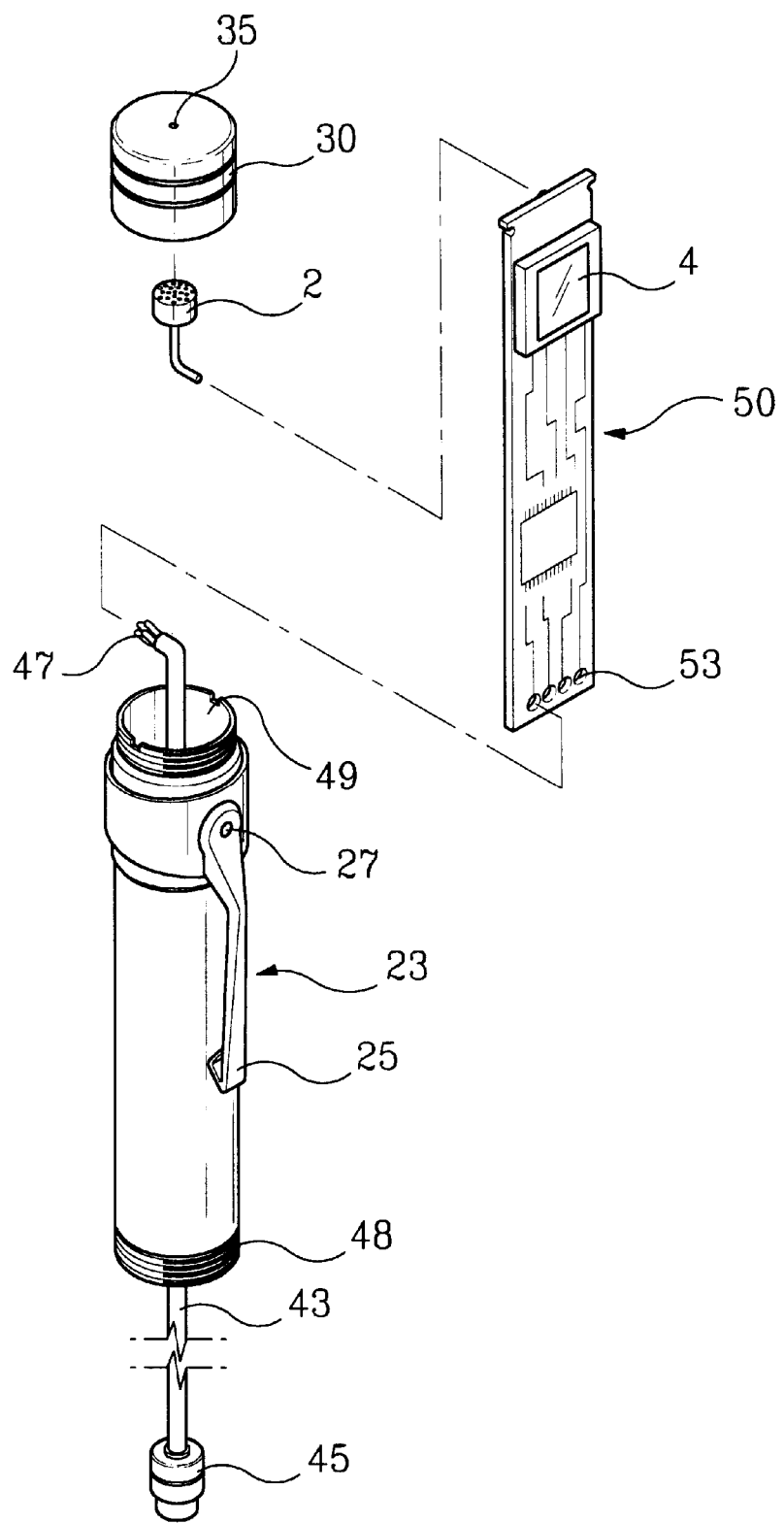
FIG. 3 is an exploded perspective view for showing a cable connected to the portable camera of FIG. 2.
Figure 4:
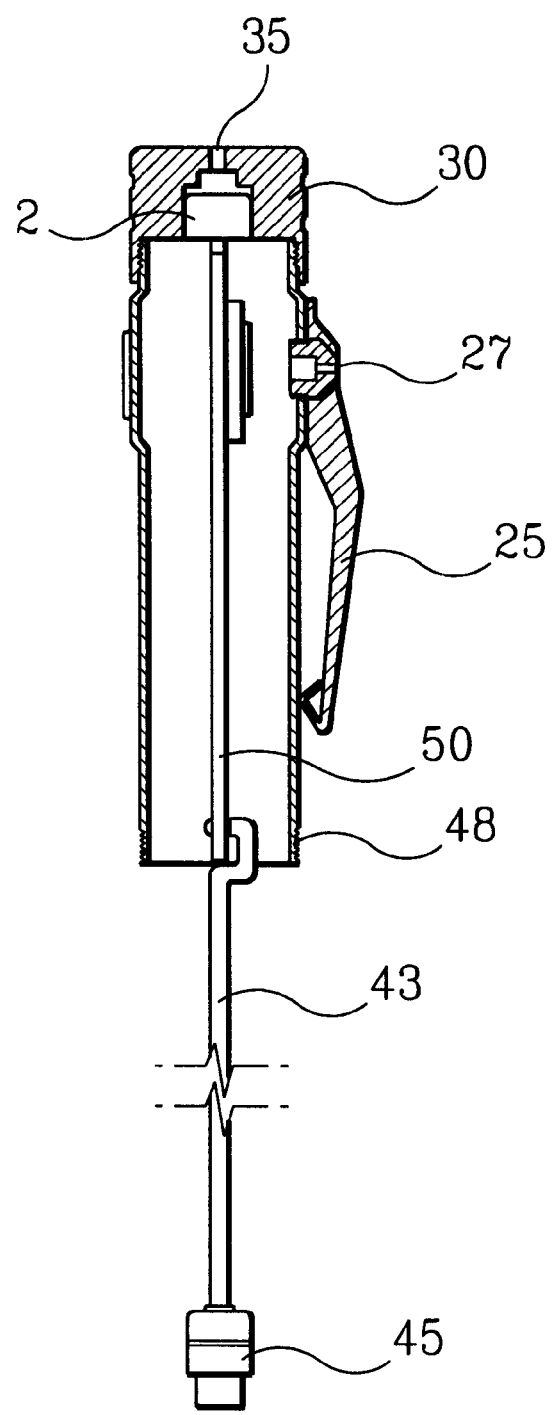
FIG. 4 is a cross-sectioned view for showing the portable camera of FIG. 3.

FIG. 3 is an exploded perspective view for showing a cable connected to the portable camera of FIG. 2, and FIG. 4 is a cross-sectioned view for showing the portable camera of FIG. 3.

A camera circuit 50 is built in the upper portion 23 of the portable camera. The camera circuit 50 has an image sensor 4, and light passing through the lens mounted in the through hole 27 is projected to image sensor 4. The microphone 2 is mounted in a groove of the button portion 30 to transmit an audio signal to the camera circuit 50. A lower end of the camera circuit 50 is connected to one end of the cable 43. The other end of the cable 43 has a jack 45 to be connected to the wireless transmission device 14.

Figure 5:
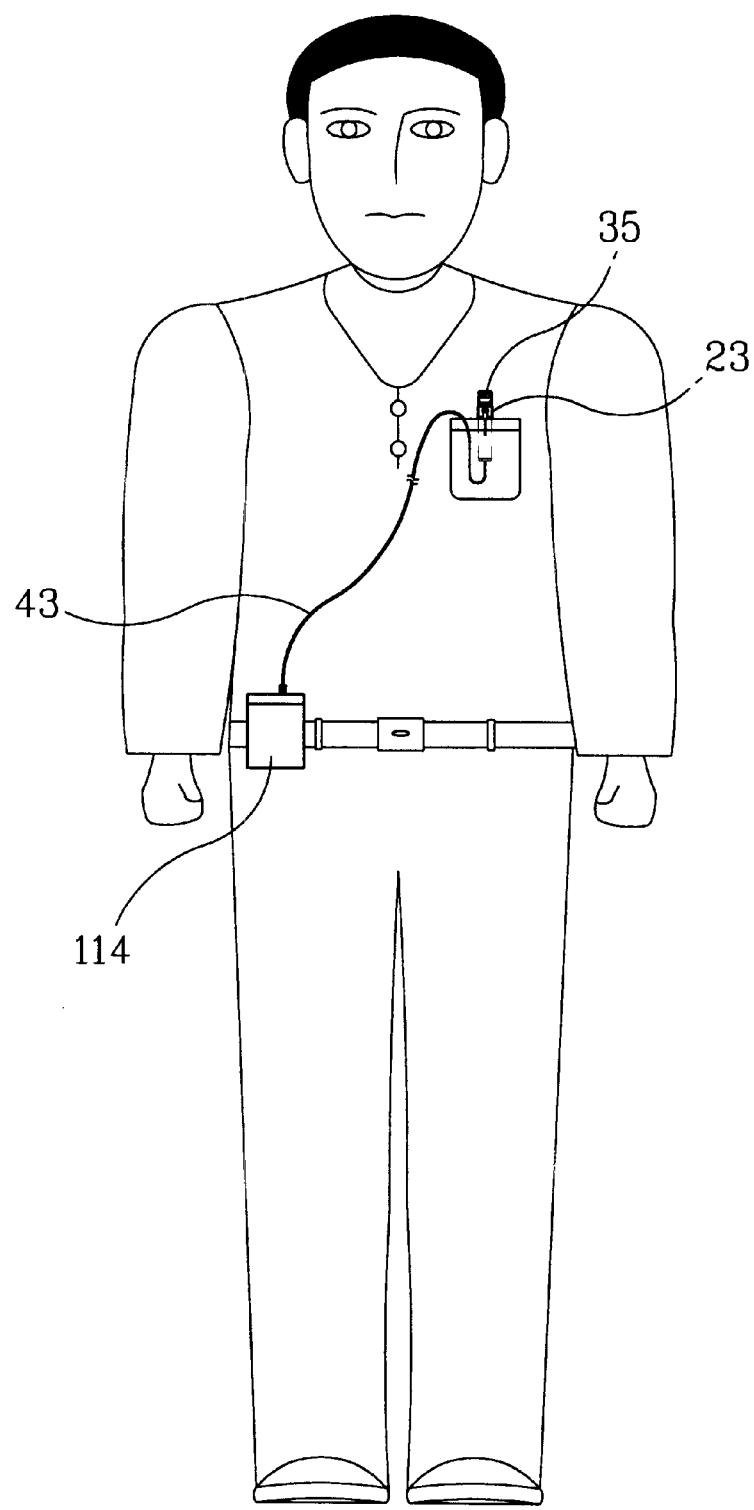
FIG. 5 is a schematic view for showing that a user bears the portable camera according to an embodiment of the present invention.

FIG. 5 is a schematic view for showing a user wearing the portable camera according to an embodiment of, the present invention. As shown in FIG. 5, the user carries the upper portion 23 of the portable camera in an upper pocket of a shirt by the clip 25. The audio and video signals are transmitted to the wireless transmission device 14 from the portable camera through the cable 43. The wireless receiving device 16 receives the FM signal and outputs the FM signal to the audio output device 18 and the video output device 20. The wireless transmission device 14 has a power supply and an RF modulation part. Electric power of the power supply of the wireless transmission device 14 is transmitted to the camera circuit 50 through the cable 43.

In the embodiment of the present invention as described above, signals are directly transmitted to the wireless receiving device 16, and it is obvious to one skilled in this field that the wireless receiving device 16 can be connected to a recording device. Further, if necessary, one wireless receiving device 16 amplifies a wireless signal and transmits the amplified wireless signal to another wireless receiving device.

What is claimed is:

1. A portable small-sized camera comprising:
    a case having a ball-point appearance in a portion thereof,
    a clip attached to an upper portion of a body of the case,
    a through hole formed at a connection point of the clip and the body of the case,
    a lens installed in an inward portion of the through hole, and
    a camera circuit part built in the case for photographing an object through the through hole.

2. The portable camera as claimed in claim 1, further comprising:
    a cable mounted in the case and for transmitting a signal from the camera circuit part; and
    a wireless transmission device connected to the cable and for transmitting a signal to a remote location.

3. The portable camera as claimed in claim 2, wherein the wireless transmission device is put on a waist belt of a user.

4. The portable camera as claimed in claim 1, further comprising a microphone for sensing audio signals from outside.

5. The portable camera as claimed in claim 4, wherein the microphone is mounted on an upper portion of the case.

6. The portable camera as claimed in claim 1, wherein the camera circuit part includes:
    a semiconductor sensor for taking pictures; and
    a control circuit for processing a signal from the semiconductor sensor.

7. The portable camera as claimed in claim 6, wherein the portable camera further includes a microphone and the control circuit processes the signal from the microphone.

8. A wireless image transmission system for transmitting an image to a remote location, comprising:
    a portable camera having a ball-point pen appearance in a portion thereof, and a camera circuit part mounted therein for photographing an outside object,
    a transmission device for transmitting a signal from the portable camera to the remote location;
    a receiving device for receiving a signal transmitted from the transmission device; and a clip connected to a body of the portion of the portable camera, said clip having a through hole at a connection point of the clip with said body for transmitting light to the camera circuit part.

9. The wireless image transmission system as claimed in claim 8, further comprising a cable for connecting the portable camera and the transmission device.

10. The wireless image transmission system as claimed in claim 9, wherein the portable camera further includes a microphone and the transmission device transmits a voice signal.

11. The wireless image transmission system as claimed in claim 10, wherein a power supply for operating the portable camera and the transmission device is included in the transmission device, and the cable supplies an electric power to the portable camera.

12. The wireless image transmission system as claimed in claim 10, wherein the transmission device modulates a signal from the portable camera into a radio frequency(RF)-modulated signal and transmits the RF modulated signal.

13. The wireless image transmission system as claimed in claim 8, wherein a second through hole is provided for enhancing voice transmission to the transmission device, said second through hole being formed at an upper end of the portable camera.

* * * * *

UNITED STATES PATENT AND TRADEMARK OFFICE
CERTIFICATE OF CORRECTION

PATENT NO. : 6,667,771 B1
DATED : December 23, 2003
INVENTOR(S) : Heuk Sup Kweon It is certified that error appears in the above-identified patent and that said Letters Patent is hereby corrected as shown below:

<u>Title page,</u>
Item [75], Inventors, "Sup Heuk" should read -- Heuk Sup --; and
Item [73], Assignee, "KT & Co." should read -- KT & C Co., Ltd. --.

Signed and Sealed this

Twenty-third Day of March, 2004

JON W. DUDAS
*Acting Director of the United States Patent and Trademark Office*